US011909137B2

(12) United States Patent
Martin

(10) Patent No.: US 11,909,137 B2
(45) Date of Patent: Feb. 20, 2024

(54) SPRING CLIP HEADER FOR FLAT FLEXIBLE CABLE

(71) Applicant: TE Connectivity Solutions GmbH, Schaffhausen (CH)

(72) Inventor: Galen M. Martin, Middletown, PA (US)

(73) Assignee: TE Connectivity Solutions GmbH (CH)

( * ) Notice: Subject to any disclaimer, the term of this patent is extended or adjusted under 35 U.S.C. 154(b) by 23 days.

(21) Appl. No.: 17/713,714

(22) Filed: Apr. 5, 2022

(65) Prior Publication Data

US 2023/0318214 A1 Oct. 5, 2023

(51) Int. Cl.

| | |
|---|---|
| ***H01R 12/77*** | (2011.01) |
| ***H01R 12/79*** | (2011.01) |
| *H01R 12/88* | (2011.01) |
| *H01R 12/89* | (2011.01) |

(52) U.S. Cl.

CPC ......... *H01R 12/778* (2013.01); *H01R 12/774* (2013.01); *H01R 12/79* (2013.01); *H01R 12/88* (2013.01); *H01R 12/89* (2013.01)

(58) Field of Classification Search

None

See application file for complete search history.

(56) References Cited

U.S. PATENT DOCUMENTS 5,173,058 A * 12/1992 Broeksteeg .......... H01R 13/193 439/267
2023/0030550 A1* 2/2023 Masaki ................ H01R 12/778

* cited by examiner

*Primary Examiner* — Ross N Gushi

(57) ABSTRACT

A connector for a flat flexible cable includes a housing defining a receptacle receiving the flat flexible cable, and an actuator movably mounted to the housing. A conductive terminal is positioned within the receptacle and includes a first portion arranged in contact with the actuator, and a surface mounting tab extending through the housing and having an end positioned on an exterior surface of the housing. The first portion of the terminal is biased between an open position and a clamping position by the actuator.

20 Claims, 5 Drawing Sheets

SPRING CLIP HEADER FOR FLAT FLEXIBLE CABLE

FIELD OF THE INVENTION

The present invention relates to electrical connectors, and more particularly, to an electrical connector or header for a flat flexible cable.

BACKGROUND

As understood by those skilled in the art, flat flexible cables (FFCs) or flat flexible circuits are electrical components consisting of at least one conductor (e.g., a metallic foil conductor) embedded within a thin, flexible strip of insulation. Flat flexible cables are gaining popularity across many industries due to advantages offered over their traditional "round wire" counter parts. Specifically, in addition to having a lower profile and lighter weight, FFCs enable the implementation of large circuit pathways with significantly greater ease compared to a round wire-based architectures. As a result, FFCs are being considered for many complex and/or high-volume applications, including wiring harnesses, such as those used in automotive manufacturing.

A critical obstacle preventing the implementation of FFCs into these applications includes the need to develop quick, robust, and low resistance termination techniques which enable an FFC to be mating with various components, including in applications requiring surface mounted connections. Current FFC harness connectors utilized in surface mounting applications include several plastic housing components, as well as electrical connections between the harness connector and a traditional surface mounted header. These components can fail over time, in addition to being relatively complex and costly.

Improved solutions for establishing surface mounted electrical connections with flat flexible cables are desired.

SUMMARY

In one embodiment of the present disclosure, a connector for a flat flexible cable includes a housing defining a receptacle receiving the flat flexible cable, and an actuator movably mounted to the housing. A self-locking conductive terminal is positioned within the receptacle and includes a first portion arranged in contact with the actuator, and a surface mounting tab extending through the housing and having an end positioned on an exterior surface of the housing. The first portion of the terminal is biased by the actuator between an open position and a clamping position.

BRIEF DESCRIPTION OF THE DRAWINGS

The invention will now be described by way of example with reference to the accompanying Figures, of which.

DETAILED DESCRIPTION OF THE EMBODIMENTS

Figure 1:
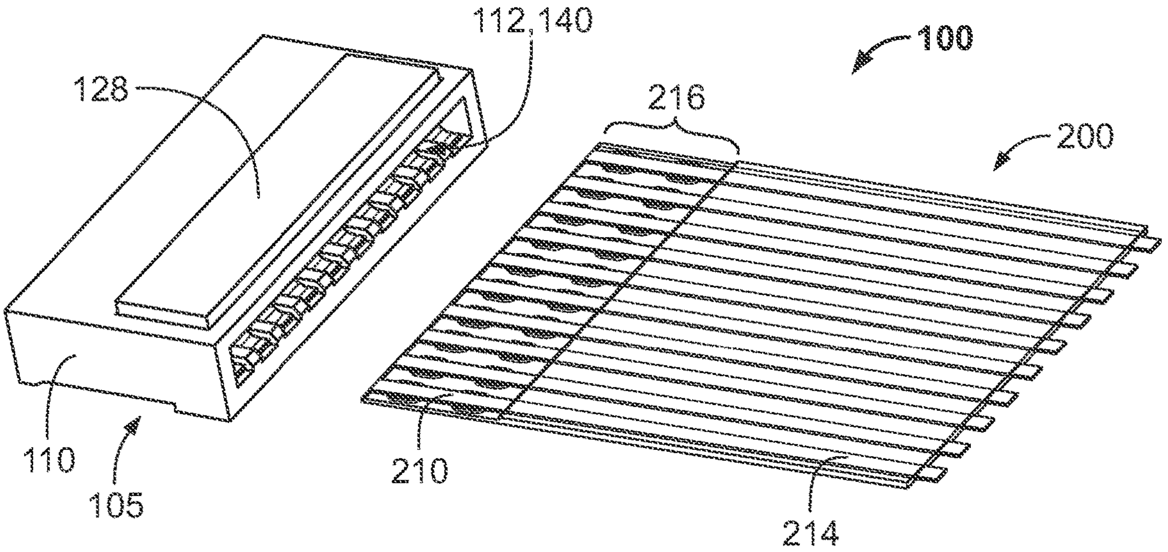
FIG. 1 is a perspective view of an FFC connector and an FFC according to an embodiment of the present disclosure in an unmated state.
Figure 2:
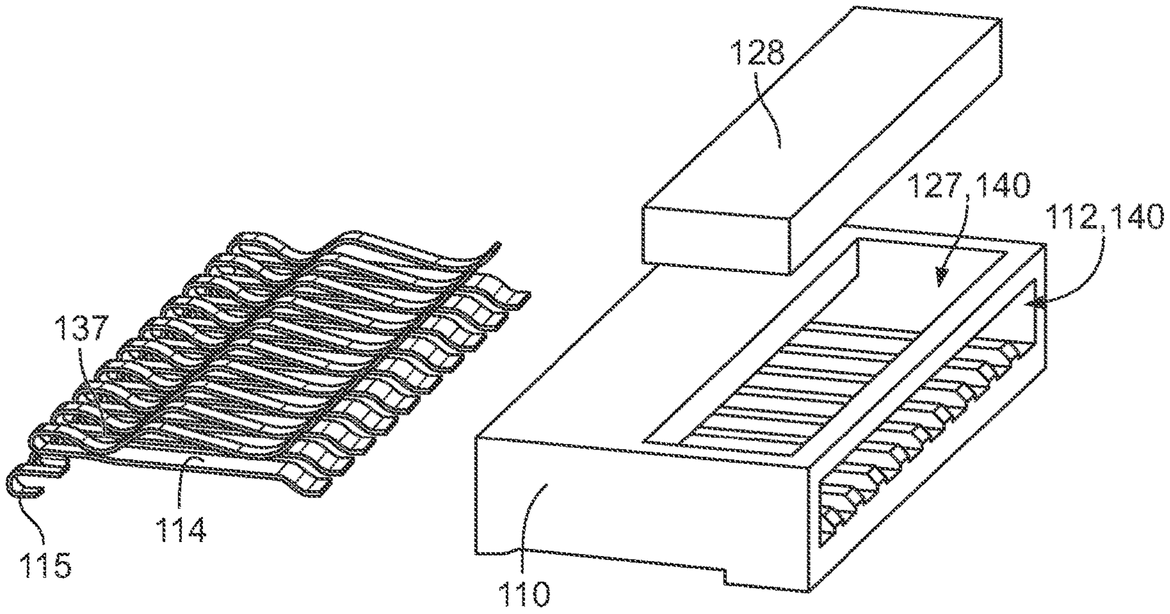
FIG. 2 is an exploded view of the FFC connector of FIG. 1.
Figure 3:
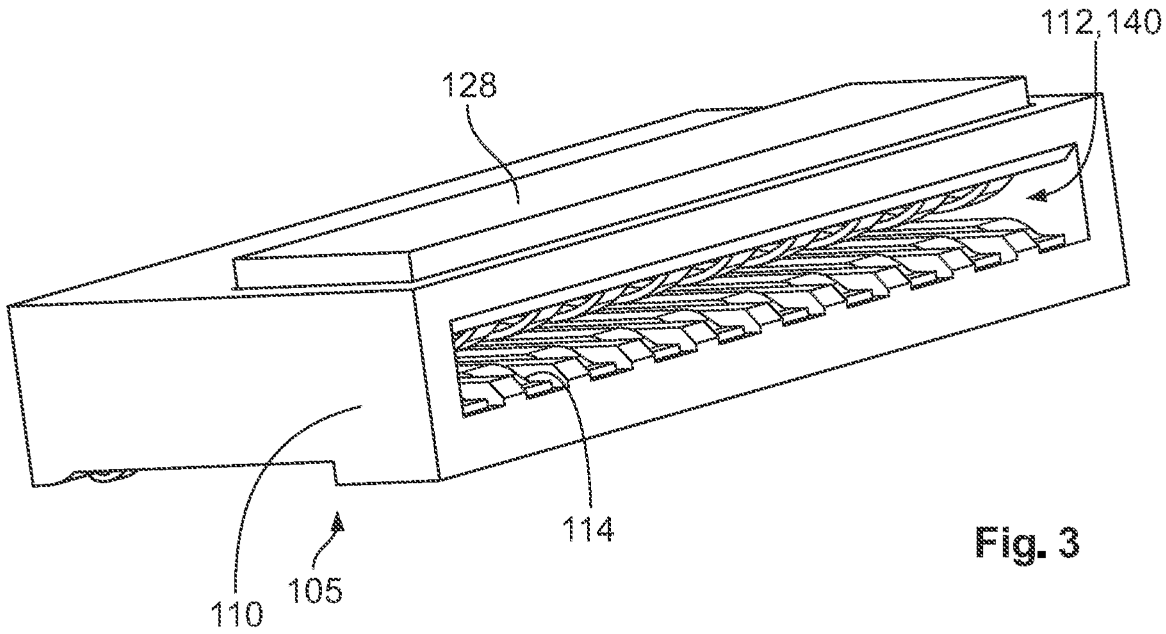
FIG. 3 is a front perspective view of the FFC connector of FIG. 1.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Embodiments of the present disclosure include a surface mountable connector or header for use with a flat flexible cable (FFC) or flat printed cable (FPC). The connector includes a housing in which one or more self-locking spring clips or terminals for capturing exposed conductors of the FFC are arranged. An actuator is provided on the housing for biasing the spring clips into their locked position, securing the FFC in a conductive manner within the housing. The spring clips also extend through the housing and define exterior surface mounting features to be directly connected to a component, such as a printed circuit board or the like.

As shown in FIG. 1, a connector or header assembly 100 according to an embodiment of the present disclosure is adapted for use with an FFC, such as the exemplary illustrated segment of an FFC 200. The FFC 200 generally includes a plurality of conductors 210 embedded within an insulation material 214. The conductors 210 may comprise metallic sheet or foil, such as copper foil, by way of example only, patterned in any desirable configuration. The insulation material 214, such as a polymer insulation material, may be applied to either side of the conductors 210 via an adhesive, resulting in an embedded conductor arrangement. One or more portions or windows 216 of the insulation material 214 may be removed (or may not be initially applied) in select areas to expose sections of the otherwise embedded conductors 210. In the exemplary embodiment, the absent portion 216 of the FFC 200 defines a single continuous window exposing the ends of each of the conductors 210 on a top side thereof, while a bottom portion of the insulation material 214 remains present for added stability and strength.

Referring generally now to FIGS. 1-7, the header assembly 100 comprises a header or connector 105 including a housing 110 for receiving the FFC 200 therein. As shown, the housing 110 defines a front or first opening 112 in communication with an interior terminal receptacle 140 for receiving an end of the FFC 200. A plurality of conductive terminals 114 are arranged within the receptacle 140 and are adapted to electrically contact, and more specifically selectively clamp to, the exposed conductors 210 of the FFC 200. The terminals 114 may be formed from a conductive material, such as steel, copper or other alloys, and may be formed into the illustrated shape via, for example, bending operations performed on generally flat stock material. In one embodiment, some or all of the terminals 114 may be interconnected, in other embodiments, each of the terminals 114 is separate and electrically isolated from a remainder thereof.

A second opening 127 is formed through a top side or wall of the housing 110 and is also in communication with the receptacle 140. The opening 127 movably or slidably receives an actuator or button 128 therein for selectively locking the FFC 200 within the housing 110. More specifically, the actuator 128 is movable between an unlocked position and a locked position within the opening 127. In the locked position, the actuator 128 is adapted to apply a downward pressure on each of the terminals 114 simultaneously, clamping the FFC 200 within the housing 110 in a conductive manner. The actuator 128 is held or fixed in the locked position by the self-locking terminals 114, as will be set forth in detail herein.

Figure 5:
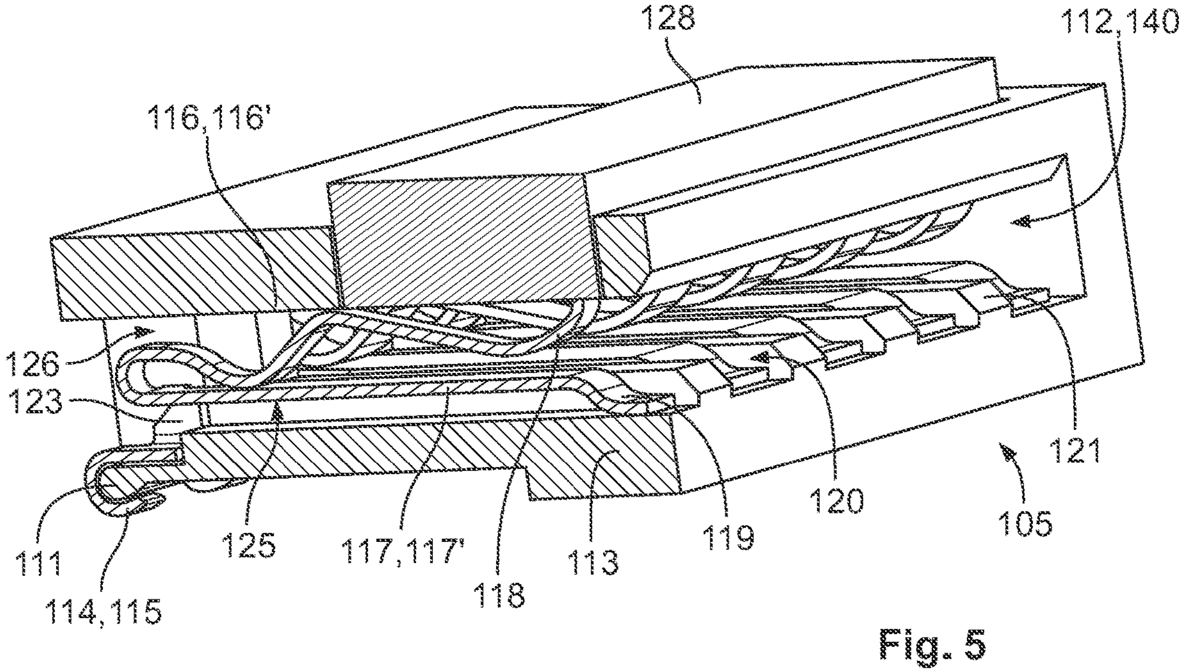
FIG. 5 is a cross-sectional view of the FFC connector of FIG. 3.
Figure 6:
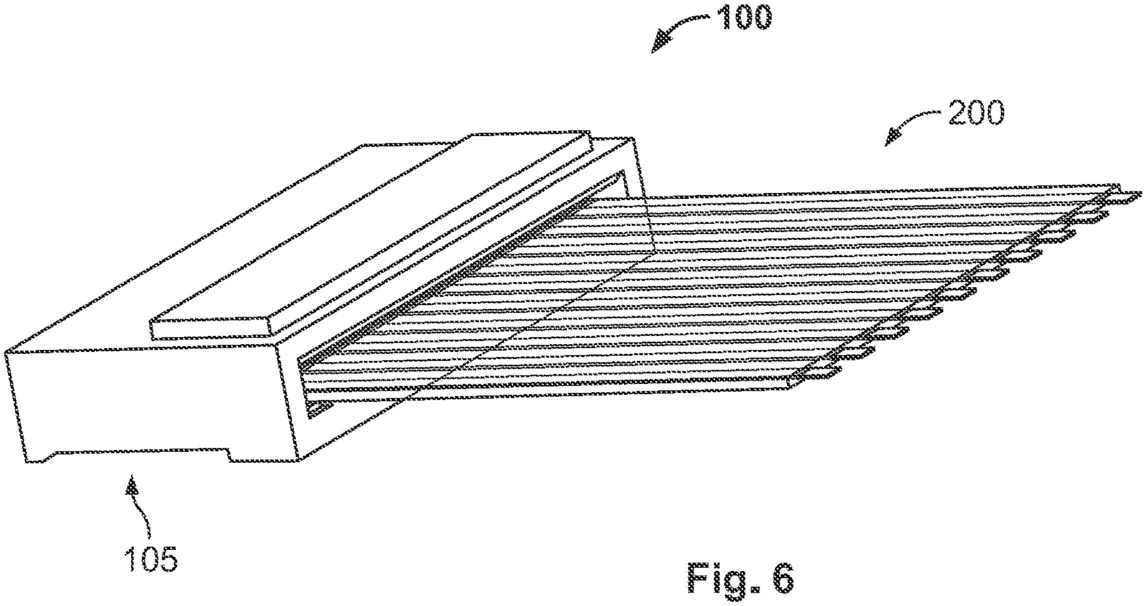
FIG. 6 is a perspective view of the FFC connector and the FFC of FIG. 1 in a mated or assembled state.

As shown in FIG. 5, each terminal 114 defines a first arm 116 and a second arm 117 attached thereto. The first and second arms 116,117 define a slot or gap therebetween for receiving the FFC 200, and more specifically, an exposed conductor thereof. The first and second arms 116,117 are connected on respective first ends oriented generally in a rear of the housing 110. Each arm 116,117 further comprises a respective second distal end 118,119 extending in direction toward a front of the housing 110. The first arm 116 initially extends downwardly to define a convergent point 125 adjacent the first end wherein the arms 116,117 contact or nearly contact one another in an open or uncompressed state of the terminal 114. The terminal 114 is adapted to contact the exposed conductor 210 of the FFC 200 at least in the area of this convergent point 125.

The first arm 116 further includes an intermediate section 116' adjacent the convergent point 125 and extending obliquely with respect to a planar section 117' of the second arm 117. The second end 118 of the first arm 116 extends from the intermediate section 116' in a partially opposite direction so as to define an overall wave-like or W-shaped profile of the first arm. Likewise, the second end 119 of the second arm 117 extends obliquely away from a remainder thereof for raising the terminal 114 from a floor of receptacle 140. Similarly, the second end 118 of the first arm 116 also extends upwardly. The oppositely extending second ends 118,119 create a larger initial opening in each terminal 114 for more easily receiving the FFC 200.

Each terminal 114, and more specifically the second arm 117 thereof, is arranged within a respective slot 120 defined within the receptacle 140 of the housing 110 by corresponding vertical partitioning walls 121. In one embodiment, the vertical partitioning walls 121 extend only partially into the receptacle 140 in the vertical direction, permitting the passage of the insulation material 214 arranged between each of the conductors 210 of the FFC 200 during insertion. In other embodiments, the partitioning walls 121 may extend between the top and bottom walls of the housing 110. In this embodiment, corresponding slots may be formed through the FFC 200 in the areas between each of the conductors 210 such that the FFC may still be received within the receptacle 140.

Figure 7:
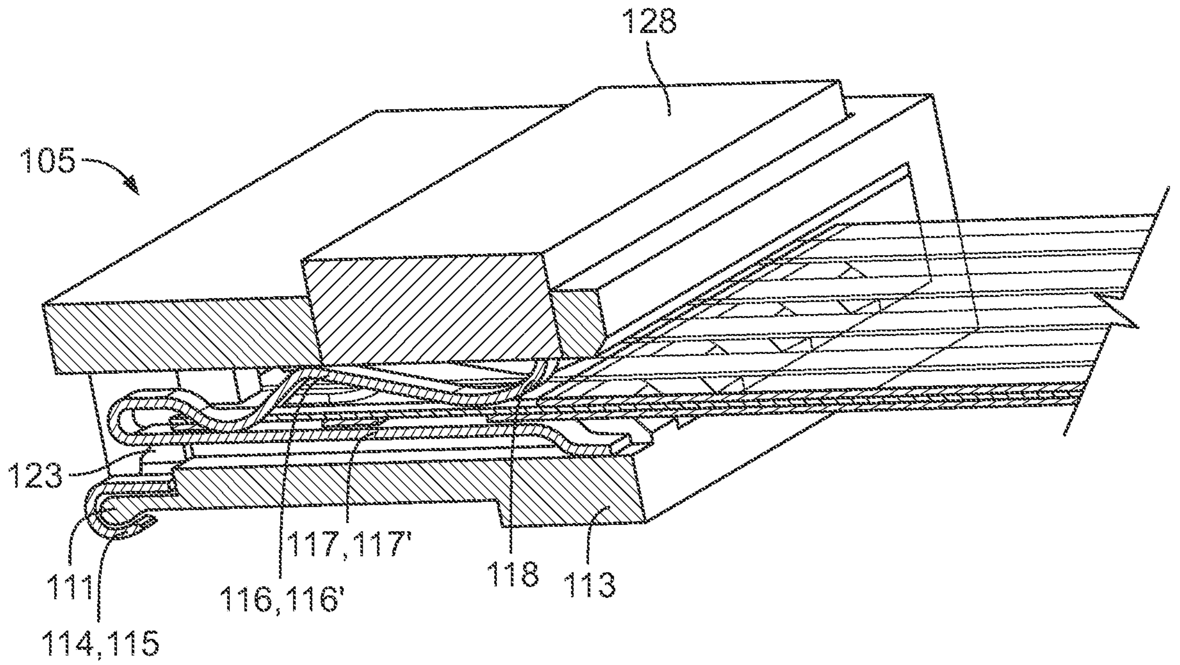
FIG. 7 is a cross-sectional view of the assembly of FIG. 6.

As can be visualized particularly from FIGS. 5 and 7, depression of the actuator 128 relative to the housing 110 is operative to flatten each of the terminals 114 into a closed or compressed state. While pressing or depressing the actuator 128 downwardly, the actuator initially bears on at least the intermediate portion 116' and/or the second end 118 of the first arm 116 of each terminal 114. The resulting downward motion of the first arm 116 clamps the FFC 200 and its conductors 210 between the first arm 116 and the second arm 117 of each terminal 114. Further, as the terminals 114 are flattened, the first arms 116 are lengthened in a direction generally toward a front of the housing 110.

In one embodiment, the terminals 114 comprise self-locking spring clips having a mechanical locking feature 137 (see FIGS. 8-10), such as a latch, provided on, for example, the first arm 116 for engaging with the second arm 117 after compression via the actuator 128, fixing the first arm 116 relative to the second arm 117 in a clamped position. In other embodiments, a latch may be used to fix the actuator 128 in the locked position for maintaining compression on the terminals 114 (see also FIGS. 9 and 10), and the locking feature 137 may be omitted.

Each terminal 114 further defines mounting tabs 115 extending through a respective opening 126 defined in the rear of the housing 110, enabling the header assembly 100 to be directly surface mounted to another component. The openings 126 may be defined by the partitioning walls 121 and the top and bottom walls of the housing 110. Specifically, as shown in FIG. 4, in a rear of the housing 110, the partitioning walls 121 may be heightened so as to extend fully between the top and bottom walls of the housing, forming each opening 126.

Figure 4:
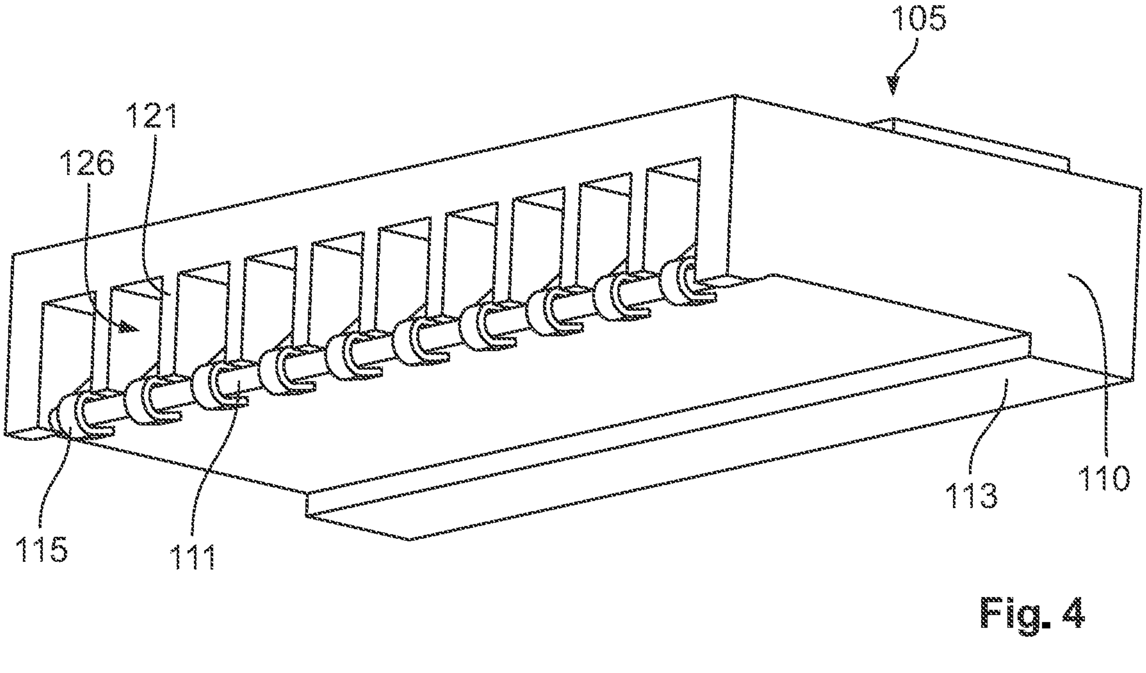
FIG. 4 is a rear perspective view of the FFC connector of FIG. 1.

With particular reference to FIGS. 4 and 5, in one embodiment, each terminal 114 defines a foot 123 extending downwardly from the second arm 117. The surface mounting tabs 115 extend laterally and downwardly from the foot 123 and define a hook-shaped end portion. The end portions engage with and positively capture a correspondingly shaped (i.e., semi-circular or semi-cylindrical) portion or lip 111 of the housing 110 for fixing the position of the terminal 114 within the housing, and preventing its movement in an insertion direction of the FFC 200 and a direction opposite the insertion direction. The lip 111 extends substantially the width of a rear of the housing 110, or at least across each of the rear openings 126. As shown, the lip 111 and the mounting tabs 115 extend generally downwardly from the housing 110 to a position below a planar lower surface of the housing for facilitating surface mounting (e.g., via soldering of the tabs).

In order to enable stable, flat surface mounting of the housing 110, a corresponding step or protrusion 113 extends from the bottom surface of the housing 110 proximate the front end thereof and opposite the lip 111. A height of the step 113 is generally equal to the distance between the planar bottom surface of the housing 110 and a bottom side of the mounting tabs 115 with the terminals 114 in the installed position within the housing. In this way, with the mounting tabs 115 soldered to the surface of a circuit board, by way of example, the header 105 will remain in a generally level orientation such that the FFC 200 is installed therein in a direction generally parallel with the circuit board or mounting surface of the header.

Figure 8:
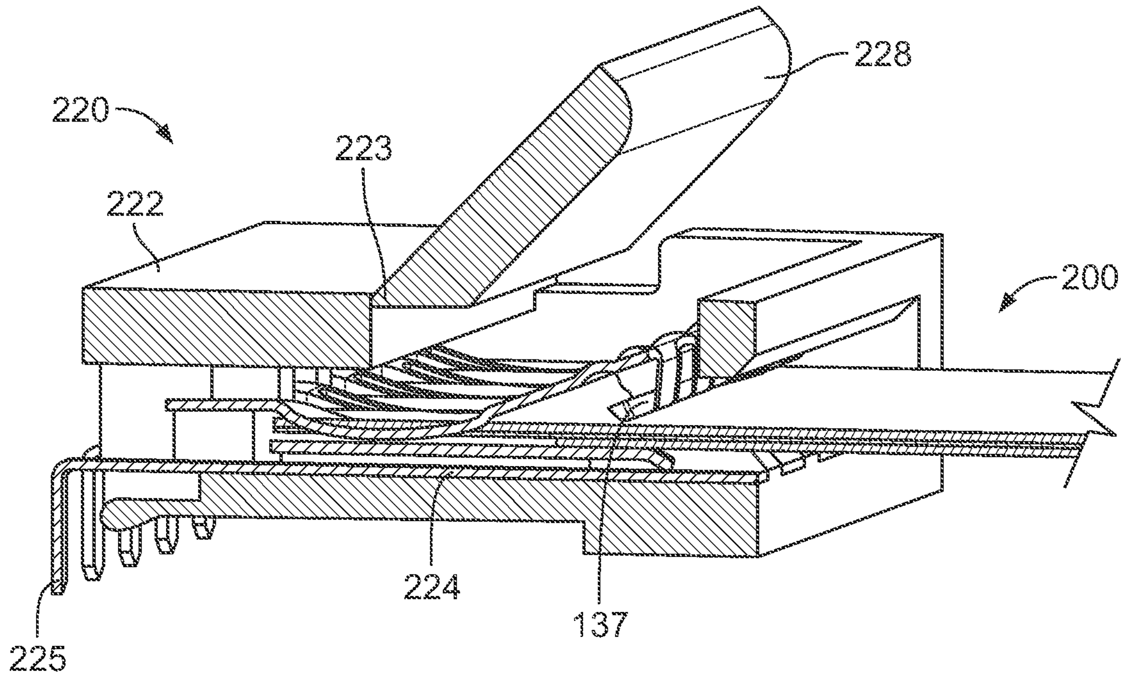
FIG. 8 is a cross-sectional view of an FFC connector according to another embodiment of the present disclosure.

Referring now to FIG. 8, according to another embodiment of the present disclosure a header assembly 220 includes a housing 222 having an actuator 228 pivotally or hingedly connected thereto. Specifically, the housing 222 and the actuator 228 may be integrally formed with one another, and define a living hinge 223 therebetween, by way of non-limiting example only. As set forth above with respect to the embodiment of FIGS. 1-7, the actuator 228 is operative to depress the illustrated upper arms of the terminals 224 into a clamped position. The locking latches 137 of the terminals 224 may engage to retain the terminals 224 in the clamped position, maintaining a clamping force on the inserted FFC 200. Unlike the surface mounting tabs of the preceding embodiments, however, the terminals 224 of the embodiment of FIG. 8 include conductive terminal pins 225 extending from their ends in a direction generally perpendicular to the insertion direction of the FFC 200. The pins 225 may be inserted into corresponding holes formed in a circuit board of an electrical device, and fixed thereto via soldering, for example.

Figure 9:
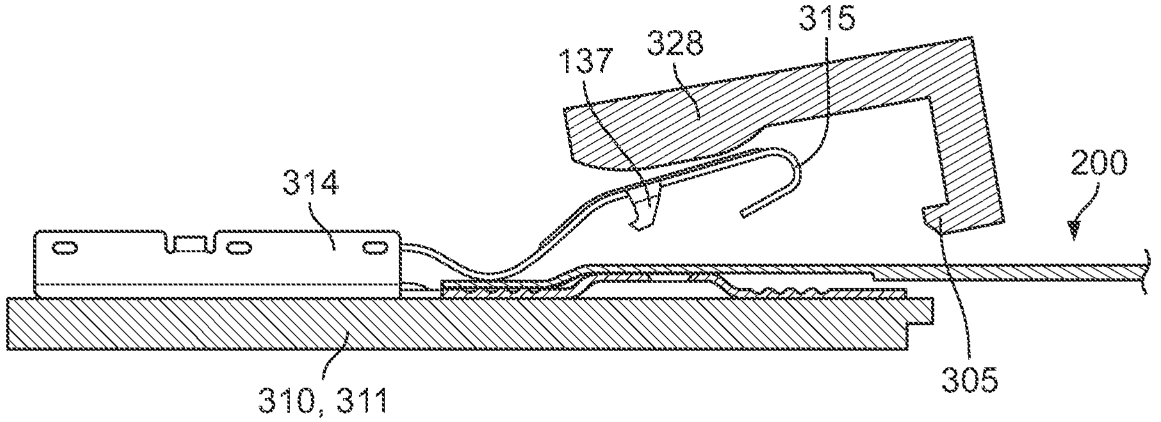
FIG. 9 is a side perspective view of an FFC connector according to another embodiment of the present disclosure in an unclamped state.
Figure 10:
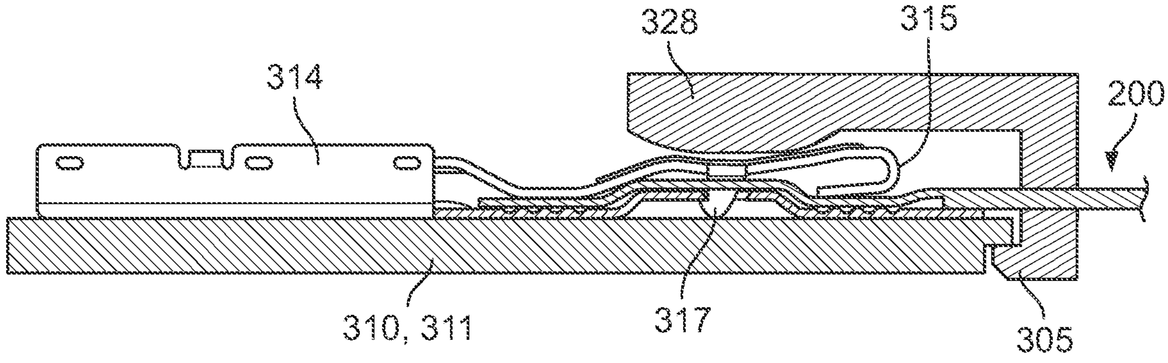
FIG. 10 is a side perspective view of an FFC connector according to another embodiment of the present disclosure in a clamped state.

Referring now to FIGS. 9 and 10, a movable actuator 328 according to another embodiment of the present disclosure may be operative to mechanically engage with, for example, a portion of a housing 310 (or directly to an electrical device 311) for fixing the actuator in a closed or clamping position. Specifically, the exemplary actuator 328 includes at least one latching feature or protrusion 305 (e.g., a hook-shaped protrusion) formed on a free, movable end thereof for selectively engaging with a corresponding feature (e.g., a recess) of the housing 310 or the device 311. In this way, a terminal 314 of the assembly is not required to have a separate latching feature (e.g., a latch 137) for maintaining its clamping position. The exemplary terminal 314 further includes a hook-shaped end 315 which may act as an elastic member or spring, limiting or otherwise controlling the compressive force placed on the FFC 200 by the terminal in the illustrated clamped position. It should be understood that only a portion of the terminal assembly is illustrated in FIGS. 9 and 10, and that the housing, the terminal and/or the actuator may comprise additional features, including those set forth above with respect to the embodiments of FIGS. 1-8.

The above embodiments of the present disclosure enable the quick and reliable connection of an unconnectorized FFC directly to a header (e.g., a surface-mounted header) without the use of any intermediate connectors and associated conductors. In this way, a low resistance connection is realized which requires less manufacturing and assembly steps. As a result of the self-locking spring clips, the header minimizes the number of required moving parts, further simplifying manufacturing and assembly processes.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A connector, comprising:

a housing defining a receptacle sized to receive a flat flexible cable;

an actuator movably mounted to the housing; and a conductive terminal arranged within the receptacle, including:

a first portion arranged in contact with the actuator and including a first arm and a second arm attached to the first arm, the first and second arms defining an opening therebetween sized to receive an exposed conductor of the flat flexible cable, the first portion of the terminal biased by the actuator between an open position and a clamping position, the terminal defining a self-locking spring clip in which one of the first arm or the second arm defines a latch for retaining the terminal in the clamping position; and a mounting portion extending from the first portion of the terminal and through the housing, the mounting portion having an end exposed on an exterior surface of the housing.

2. The connector of claim 1, wherein the actuator is mounted within an opening formed through a wall of the housing, the opening in communication with the receptacle.

3. The connector of claim 1, wherein the actuator is selectively fixable to the housing for maintaining the terminal in the clamping position.

4. The connector of claim 1, wherein the actuator is hingedly connected to the housing.

5. The connector of claim 1, wherein the first arm defines at least one arcuate segment engaging with the actuator.

6. The connector of claim 1, wherein the mounting portion comprises a surface mounting tab exposed on an underside of the housing, the tab extending from the second arm and defining a hook-shaped end capturing a correspondingly shaped portion of the housing.

7. The connector of claim 6, wherein the housing defines an opening in a rear wall receiving the surface mounting tab therethrough.

8. The connector of claim 1, wherein the mounting portion comprises a mounting pin extending from the second arm in a direction generally perpendicular to an insertion direction of the flat flexible cable.

9. The connector of claim 1, further comprising a plurality of terminals arranged within the receptacle, each terminal simultaneously biased into the clamping position by the actuator.

10. The connector of claim 9, further comprising a plurality of partitioning walls defined in the receptacle and arranged between each of the plurality of terminals, the partitioning walls defining a plurality of corresponding openings receiving a plurality of mounting portions therethrough.

11. A connector assembly, comprising:

a flat flexible cable having a plurality of conductors exposed through an insulation material on an end section of the cable and on at least one of a top or bottom side of the cable; and a plurality of terminals adapted to connect to an electrical device, each terminal including:

a clamping portion engaging with the exposed conductors of the flat flexible cable and including a first arm and a second arm attached to the first arm, the first and second arms defining an opening therebetween sized to receive an exposed conductor of the flat flexible cable; and a conductive mounting portion extending from the clamping portion for connecting to the electrical device; and an actuator biasing the clamping portions between an open position in which the flat flexible cable is received by the clamping portions, and a clamping position in which the exposed conductors of the flat flexible cable are fixed to the terminals, the plurality of terminals defining self-locking spring clips in which one of the first arm or the second arm of each terminal includes a latch for retaining the terminal in the clamping position, the first arm of each of the terminals electrically contacting a respective one of the exposed conductors in the clamping position.

12. The connector assembly of claim 11, further comprising a housing defining a receptacle sized to receive the flat flexible cable, the mounting portions extending through respective openings defined in a rear wall of the housing.

13. The connector assembly of claim 12, wherein the mounting portions comprise surface mounting tabs exposed on an underside of the housing, the tabs defining hook-shaped ends receiving a correspondingly shaped portion of the housing for fixing the position of the terminals within the housing.

14. The connector assembly of claim 12, wherein the housing defines a plurality of slots at least partially separating the terminals within the receptacle.

15. The connector assembly of claim 12, wherein the housing includes an opening formed through a top wall thereof, the actuator slidably received within the opening.

16. The connector assembly of claim 12, wherein each of the first and second arms of the spring clips are connected on a first end thereof and define an open second end receiving the flat flexible cable.

17. The connector assembly of claim 16, wherein the mounting portions extend through the housing from the second arms of the spring clips.

18. A connector, comprising:

a housing defining a receptacle sized to receive a flat flexible cable;

an actuator movably mounted to the housing; and a conductive terminal arranged within the receptacle, including:

a first portion arranged in contact with the actuator, having:

a first arm; and a second arm attached to the first arm, the first and second arms defining an opening therebetween sized to receive an exposed conductor of the flat flexible cable in an insertion direction, the first portion of the terminal biased by the actuator between an open position in which the flat flexible cable is insertable into the opening, and a clamping position in which a position of the first arm is fixed relative to the second arm; and a hook-shaped portion defined on the first arm and having a free end extending at least partially in a direction opposite the insertion direction, the free end defining a contact surface opposing the second arm;

a mounting portion extending from the first portion of the terminal and through the housing, the mounting portion having an end exposed on an exterior surface of the housing.

19. The connector of claim 18, wherein, in the clamping position:

the first arm is latched to the second arm; and the contact surface of the free end of the hook-shaped portion is adapted to engage with the exposed conductor of the flat flexible cable for securing the exposed conductor between the contact surface and the second arm.

20. The connector of claim 19, wherein, in the clamping position, the free end of the hook-shaped portion is adapted to be elastically biased by the second arm in a direction toward a remainder of the first arm for controlling a compressive force placed on the exposed conductor of the flat flexible cable.

* * * * *